8899X
No Printed Specification Available
L. Norcross.
Spinning Mach.
Patented Jun. 15, 1835.
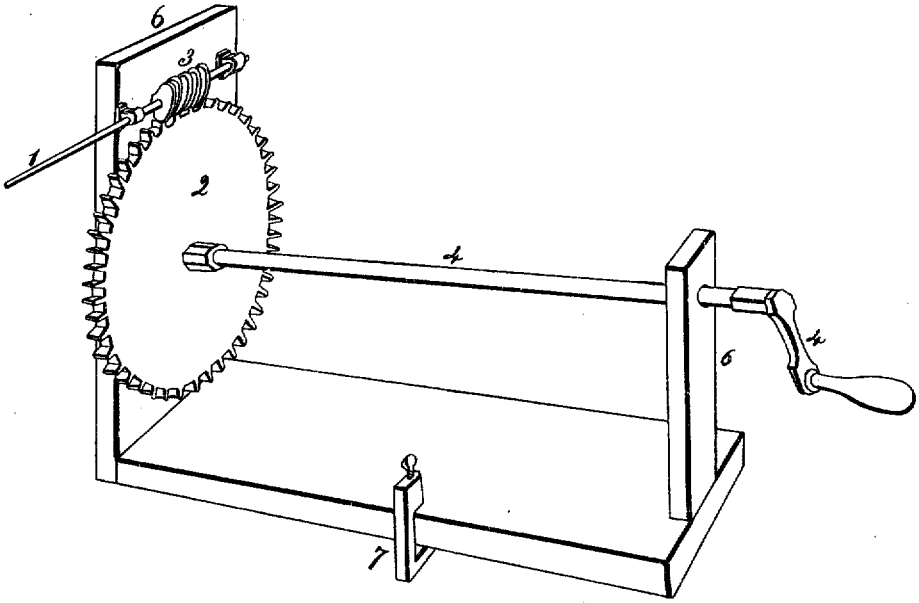
N. PETERS, PHOTO-LITHOGRAPHER, WASHINGTON, D. C.

June 15. 1835 17

Leonard Norcross Dixfield Maine
8899X

Letters Patent

The Schedule referred to in these Letters Patent and making part of the same
containing a description in the words of the said Leonard Norcross himself
of his improvement in an accelerated Spinner To all to whom these presents shall come. Be it known that I
Leonard Norcross of Dixfield in the County of Oxford and State of Maine have
invented a new and useful improvement in an accelerated Spinner and that
the following is a full and exact description of the construction and operation
of said machine as invented by me – Specification – The Spinner is construc-
ted in the following manner. 1st a Bench two feet and a half long and six
or eight inches wide one or two inches thick with a small clamp on the un-
der side for the purpose of fastening it to the edge of the table or light stand
or chair 2nd A foot at one end ten inches high with a box for one end
of a shaft to run in. At the other end a post fifteen inches high and about
the width of the bench in which the other end of the shaft and spindle are
hung – 3d A Shaft of about the length of the bench with a crank of about
five inches in length upon one end and a cog wheel near the other and hung
in the posts which have been mentioned about seven inches from the bench
4th A Cog wheel about one foot in diameter with sixty or more cogs
and is a spur wheel with cogs shaped to mash into a screw – 5th The
Spindle is about the size and length of other spinning wheel spindles. The
whir is placed near the large end and directly over the centre of the cog wheel. The
whir is made in the form of a screw with a thread that will fit the cogs in
the wheel. The large end of the spindle is reduced near the end nearly to a point and
[illegible] as a pivot in an concave box near the edge of the side post. Near the other edge of the post
is a box in which the spindle runs. The spindle is so constructed as not to work endwise. This im-
provement consists in the application of the above described gear to turn a spindle for the purpose of
spinning in the manner above specified & is that for which I pray for Letters Patent January 7th 1835

Witnesses { Lorenzo Stowell
{ Daniel Randall

Leonard Norcross 464 words (Patented 15 June 1835) ([illegible])